INVENTORS
WILLIAM H. PARMELEE.
HARRY S. NAGIN.

INVENTORS
WILLIAM H. PARMELEE.
HARRY S. NAGIN.

March 24, 1970    W. H. PARMELEE ET AL    3,502,136
APPARATUS FOR THE CASTING OF GRATINGS AND OTHER
STRUCTURES WITH PARALLEL MEMBERS AND
TRANSVERSE CONNECTIONS Filed July 17, 1967    6 Sheets-Sheet 6

*INVENTORS*
WILLIAM H. PARMELEE.
HARRY S. NAGIN.

United States Patent Office 3,502,136
Patented Mar. 24, 1970

3,502,136
APPARATUS FOR THE CASTING OF GRATINGS AND OTHER STRUCTURES WITH PARALLEL MEMBERS AND TRANSVERSE CONNECTIONS
William H. Parmelee, Bethel Park, and Harry S. Nagin, Bala Cynwyd, Pa., assignors to Reliance Steel Products Company, McKeesport, Pa., a corporation of Pennsylvania
Substituted for abandoned application Ser. No. 428,501, Jan. 27, 1965, and a continuation-in-part of application Ser. No. 460,984, June 3, 1965. This application July 17, 1967, Ser. No. 659,272
Int. Cl. B22d 11/12
U.S. Cl. 164—282                    5 Claims

ABSTRACT OF THE DISCLOSURE

A continuous casting machine is disclosed for making gratings and other products having two or more longitudinally-extending bars connected by spaced cross bars. It utilizes a continuous series of mold elements moving in abutting side-by-side relation in a closed path having a casting reach and a return reach with the mold elements being connected for limited movement in a plane relative to one another after the cast material has set to release the mold elements from the cross bars of the casting.

---

This application is for a method of and apparatus for continuously casting a grating or other similar structure having longitudinal members and connecting transverse members, and is a substitute for abandoned application Ser. No. 428,501, filed Jan. 27, 1965, and is a continuation-in-part of our application Ser. No. 460,984, filed June 3, 1965, now issued as Patent 3,342,251, granted Sept. 19, 1967.

The application discloses a continuous series of connected mold elements traveling in an endless band over a support with a forward, generally horizontal reach, and a return reach. Each mold element has grooves therein extending in the direction of travel of the molds that register with similar grooves in adjacent sections to form continuous longitudinal casting recesses, and the mold elements are recessed part way across their confronting faces to form casting recesses crosswise of the direction of travel that intersect the longitudinal recesses. The linkage connecting the molds permits them to hinge relatively to one another and to also move vertically in a direction normal to the direction of travel. Molten metal or plastic fills the grooves at one end of the apparatus, and when it has solidified the molds move in succession vertically as described to clear the cast product.

Structures commonly referred to as gratings, used for sidewalks and other walkways, paving, either exposed or embedded in concrete, or supporting traffic-bearing metal plates for airfield landing strips, planks, etc. commonly comprise generally parallel bearing bars carrying imposed loads with crossbars at intervals to distribute the loads. For purposes of illustration, reference will frequently be made to gratings, but not for limiting or excluding other structures having longitudinal and transverse bar sections.

Gratings have heretofore and presently are made by joining bearing bars with cross bars in various ways both by mechanical joints of various types and commonly by welding. Even with great care in manufacturing them, the joints commonly develop looseness, mainly due to fatigue at the intersection. This is particularly true with gratings subjected to heavy loads or repeated heavy impact.

Relatively small grating structures have been made by conventional casting procedures, as for example gratings for sewer inlets, but this is not feasible or economical for bridge floors, or many other applications where gratings are employed.

This invention is for a method of and apparatus for the manufacture of such gratings by casting the gratings so that cross bars and bearer bars are integral. The invention is applicable to the manufacture of gratings from molten metal or from reinforced casting plastics. Moreover, the invention is designed to produce grating in continuous or indefinite lengths so that much of the waste involved in making it in panels of a definite length and then cutting these panels into fractional pieces for specific locations is eliminated. Additionally, the invention is applicable to the manufacture of metal plates with grate-like ribs on one face, and as above indicated for other structures.

The invention further contemplates that the gratings so formed may be flanged at both the top and bottom in such manner as to provide added strength and structural stability, preferably by casting the flange on the top edges of the bearing bars and subsequent to casting flanging the bottoms of the bearing bars by mechanical procedures, as for example by extrusion.

The invention further contemplates the application of abrasive grains to the top surface of the gratings after the cast has been made but before complete solidification of the cast material in the molds has taken place.

According to a preferred embodiment of the invention, there is provided an endless series of movable mold elements having parallel registering longitudinal grooves and providing intersecting transverse grooves. As this series of mold elements moves along over a planar surface with several sections in abutting contact, the liquid casting material, as molten metal or liquid plastic, is filled into the grooves and as the mold elements travel along the cast material solidifies. Each mold section or element is then stripped away in succession from the casting. In the case of plastic, the casting may continue to move on through a curing oven, and in the case of metal, it may be cut into lengths as finished product, or desirably the metal is extruded or otherwise worked to develop further strength in the casting and/or modify its shape.

The invention may be more fully understood by reference to the accompanying drawings which show certain apparatus embodying the invention, but it will be understood that the structures are illustrative and that various changes and modifications may be made therein within the scope of our invention.

The organization of the apparatus is basically the same for different casting materials, utilizing the same mold elements, or organization of mold elements. This apparatus comprises an articulated series of mold elements or sections, and for purposes of illustration the parts are here shown in their simplest form.

These mold sections form an endless succession or series, designated generally as 2, with a generally horizontal top reach 3 and a return reach 4, with guides 5 at the end where the sections move from the bottom to the top, hereinafter called the forward end, and similar guides 6 at the opposite or discharge end.

Each mold section is a generally rectangular block 7 with the long direction extending crosswise of the direction of travel, and there are deep grooves 8 in the top extending transversely of this long direction with the grooves spaced at regular intervals determined by the spacing of the longitudinal bars in the grating to be produced. The grooves 8 in the several sections are all in longitudinal alignment. The top longitudinal edges of the block, both front and back, from the groove 8 at one end to the groove 8 at the other, are cut back at a slight bevel for a depth less than the depth of the grooves 8, such cut-back surfaces being designated 9. The confronting faces of the blocks are otherwise machine finished to a plane, the arrangement being such that when two blocks are pressed together there is a transverse groove 11 formed between these cut-back surfaces. Therefore, in the top reach of the endless series the grooves 8 form a series of parallel deep grooves extending from one end to the top reach to the other, and there are intersecting transverse grooves 11 of less depth at regular intervals crosswise of the reach.

The invention contemplates generally that the casting material in liquid form is filled into these grooves, and solidifies with the sections moving from the forward end toward the rear, and then the mold sections in turn drop down and are carried around the guides 6 while the casting continues to move horizontally in the direction of travel of the top reach.

Figure 7:
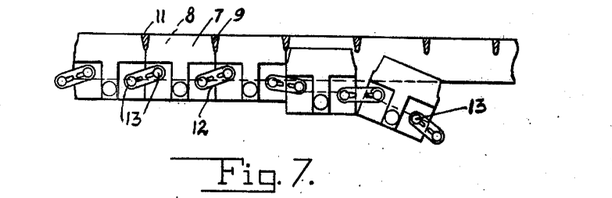
FIG. 7 is a side elevation of a series of mold sections at the discharge end of the machine with the mold sections being shown in elevation and the side guides removed.
Figure 8:
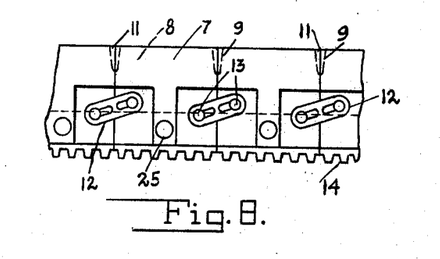
FIG. 8 is an elevation of three of the mold assemblies on a larger scale.
Figure 9:
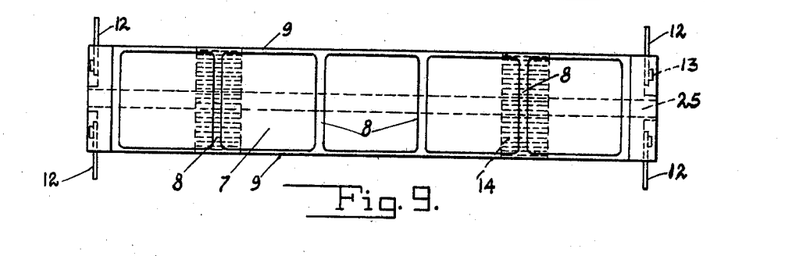
FIG. 9 is a plan view of a single mold block on the same scale as FIG. 8.

In order to enable the successive mold sections to clear the cells in the grating that has been thus cast, the ends of the individual sections are connected by links 12 which are slotted at one, and preferably at both ends, with pivot pins 13 projecting from the blocks and having a working fit in these slots. As shown in FIG. 7, this connection allows the section at the discharge end of the upper reach of connected sections to drop below the level of the ones which follow and clear the cross bar elements of the casting and then continue around the guides 6, but without disturbing the next-succeeding block or mold section which is still supported at the level of the top reach. The ends of the individual mold sections as distinguished from the ends of the entire apparatus may be recessed, as indicated, to receive the links and pivot pins so that they do not project beyond the ends of the sections. The pivot pin 13 on one mold section is desirably at a level higher than the pivot pin at the other end of the same link, so that they will not "lock" on dead center. The slot and pivot arrangement of the links allows the center-to-center distance between blocks to remain constant as each block moves vertically relative to the preceding one in the series as shown in FIG. 7 but this distance is free to open out when the mold sections are moving around the semi-circular end supports.

Figure 1:
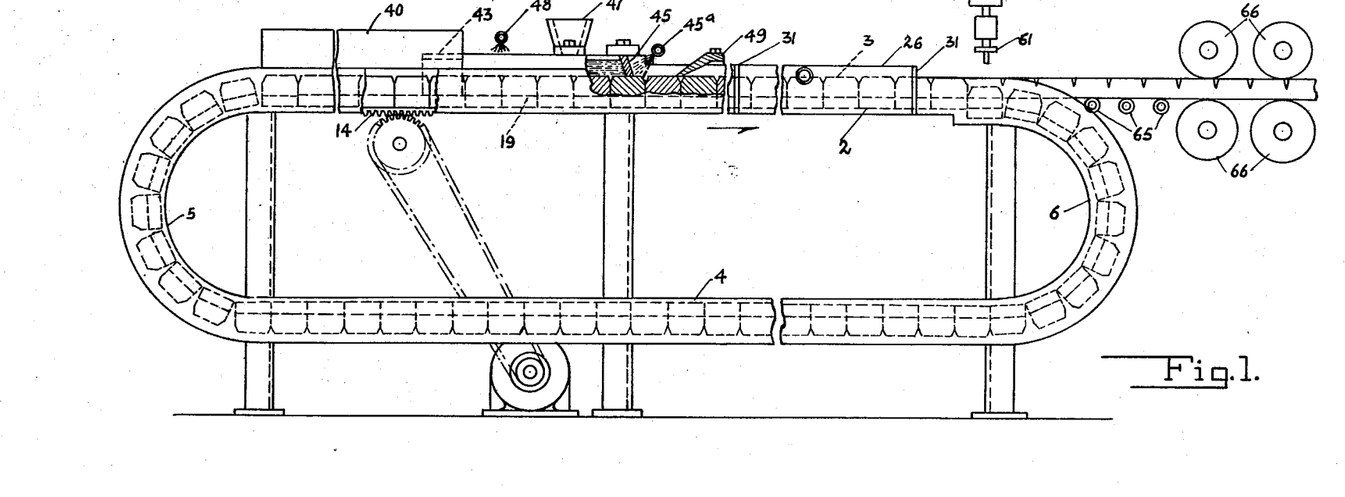
FIG. 1 is a side elevation of the complete machine with a portion thereof broken away.

For moving the endless sectional mold we have shown a toothed rack section 14 on the bottom of each mold section at each side of the longitudinal center of the direction of travel, the rack sections of all of the molds being positioned to line up behind one another. Under the top reach near the forward end of the apparatus is a shaft 15 with pinions 16 that mesh with these rack sections so that when the shaft is rotated in the direction shown by the arrow in FIG. 1, the mold sections are thrust forward, and because of being pushed in this way all of the sections in the top reach beyond the drive are tightly pressed together to form a continuous length of mold along the top reach, and of course when cast metal solidifies in the grooves, they are locked together by the casting to resist the pressure of the advancing but still unfilled blocks. A drive chain 17 passing around a sprocket on shaft 15 transmits power to this shaft from a drive 18, which is desirably a variable speed drive so that the speed of movement can be regulated as required.

The top surfaces of the individual mold sections at their two ends are rabbetted to form a shoulder. At each side of the machine along the top reach of mold sections are channel-like rails 19, with the channels turned sideways, so that the bottoms of the individual mold sections are supported at their respective ends on the bottom flanges 20 of the channels, the top flange 21 of the channel interfits with the rabbetted top ends of the mold sections, and the ends of the sections are clear of the vertical webs 22 of the channels. Graphite bronze wear strips may be provided at 23 and 24 to reduce friction. The top flange 21 desirably has an upstanding curb 21a therealong.

Figure 5:
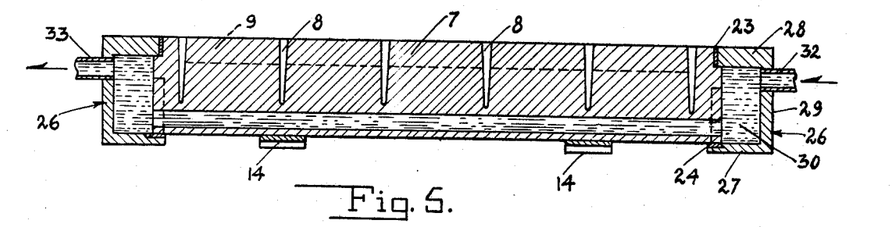
FIG. 5 is a similar section in the plane of line V—V of FIG. 1.

The mold sections may have one or more passages 25 extending lengthwise therethrough, and beyond the casting section along the upper reach the channel-like rails are of slightly modified form, as best seen in FIG. 5. Here the rails are 26 and the flanges 27 at the bottom and 28 at the top are wider so that the web 29 of each rail is spaced well out from the ends of the individual mold sections to provide fluid circulating spaces 30. The front and rear ends of the channels are closed by plates 31 that bear against the ends of the individual mold sections at each side of the apparatus. At one side of the apparatus there is a fluid supply pipe 32 opening into the space 30 and on the other side there is an outlet pipe 33.

In casting metal, cooling water may be supplied through pipe 32 so that it will flow through the mold passages 25 to cool the mold sections, the water discharging through pipe 33. In casting plastic, steam or heated fluid may be circulated in the same manner to accelerate curing of the plastic.

For the casting of metal, as for example aluminum, the mold sections are formed of metal to which molten aluminum will not adhere, or to which a release coating to prevent adhesion may be applied. Typically steel or cast iron may be used, although copper, because of its high heat conductivity, may be employed. Provision is made for heating the mold sections at the forward end of the machine to avoid too rapid chilling of the mold. For this purpose we have shown a hood 40 in which are gas burners or other heaters so that the mold sections will be at an elevated temperature when they emerge in succession from beneath the hood.

As the mold sections emerge from the heater, molten metal is introduced into the longitudinal and transverse grooves to fill them. This may be done from a plurality of separate streams from the bottom of an elevated tundish or hopper-like vessel, but a preferred arrangement is disclosed in the drawings wherein, at the end of the furnace from which the mold sections emerge, there is a refractory dam (see FIG. 11) in the form of a cross bar 43 of the width between the curbs 21a, and which has only a sliding clearance with the tops of the mold sections. Depending from this bar are fins 44 positioned to enter the longitudinal bar-forming grooves 8 and substantially fill them, the dam thus resembling a comb with widely-spaced fin-like teeth.

Spaced rearwardly from this dam is a transverse member 45, the bottom edge of which bears against the surface of the traveling molds. The curb 21a of the side support rails is also increased in height along the length of the apparatus between the dam 43 and the transverse member 45 by a refractory facing 46. At 47 is a refractory-lined vessel through which molten metal is poured onto the surface of the traveling mold to provide a pool of molten metal confined by the dam 43, the cross bar 45, and the insulated curb facings 46. Burners may be provided over this pool, as indicated at 48, both to retard heat loss from the metal and reduce oxidation by creating a non-oxidizing atmosphere over it.

The fluid metal in the pool is supplied at a rate to keep the longitudinal and cross grooves of the molds full, and the cross member 45 acts as a doctor blade to retain the surplus in the pool while leveling off the metal in the grooves. With the molds being heated, and with the addition of incoming molten metal and the burners 48, solidification of the metal in the pool is prevented, but after the metal has filled the grooves, it freezes quite rapidly.

Should there be thin fins of metal over the tops of the molds, there may be provided a diagonal shearing blade 49 immediately back of the doctor blade 45 to shear away this thin fin or flash, or it may be left in place for subsequent removal by shot or sand blasting.

Figure 10:
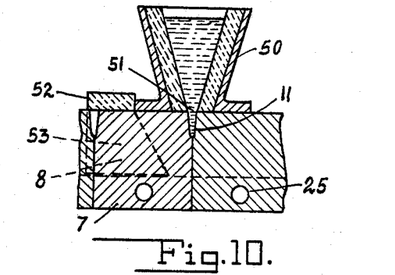
FIG. 10 is a longitudinal section through the casting portion of the machine showing a modified form of casting funnel.

As an alternative, we may dispense with a pool of metal, especially with higher melting metals, and simply employ a trough-like vessel with an opening across its bottom, with the moving mold itself contacting the bottom of the vessel. This is shown in FIG. 10 which is a fragmentary longitudinal sectional view, wherein 50 designates a refractory-lined trough with a narrow opening 51 at the bottom and metal feet that rest on the mold surface. There may be a cross support 52 forwardly of this trough with refractory fins 53 to prevent molten metal from flowing into the grooves too far ahead of the trough, as do the corresponding fins on the fins 44 of the dam previously described. It may also be desirable with higher melting metals to form the molds of copper so as to quickly conduct heat from the molten metal and to even use cooling liquid with the arrangement above described in the casting section.

Figure 6:
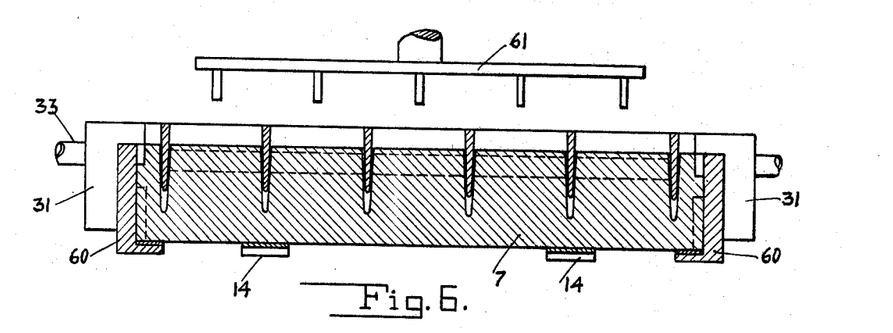
FIG. 6 is a similar section in the plane of line VI—VI of FIG. 1.

Adjacent the discharge end of the apparatus near the end of the horizontal reach, the side supporting rails 19 of channel form terminate, and beyond them for a short distance are angle or L-shaped rails 60 which are at a level below the level of the bottom legs of the channel-shaped rails a distance almost as great, if not greater, than the depth of the cross channels between confronting mold sections. As best seen in FIGS. 6 and 7, when each mold section clears the channel-shaped rails and is located over the rails 60, the mold section, by reason of the arrangement of the links 12 and pivot pins 13 can move down in a plane normal to its direction of travel so that the tops of the molds are clear of the cross bars of the casting. If necessary, a vibrating tapper arrangement or pusher, schematically indicated at 61, may be provided to assist in freeing the mold sections from the casting.

The solidified casting continues to travel in a horizontal direction away from the apparatus while the mold sections follow around the machine end guide 6 to the lower return reach.

While metal castings may be finished at this point, it is desirable while the metal is still hot to work it to some extent. The casting, clear of the molds, is supported on rollers 65, and then is moved between one or more pairs of rollers 66, which may or may not be power-driven. If they are power-driven, the air in moving the mold sections beyond the point where the metal has solidified, and they work-harden and improve the metal structure.

Figures 11, 12, 13, 14:
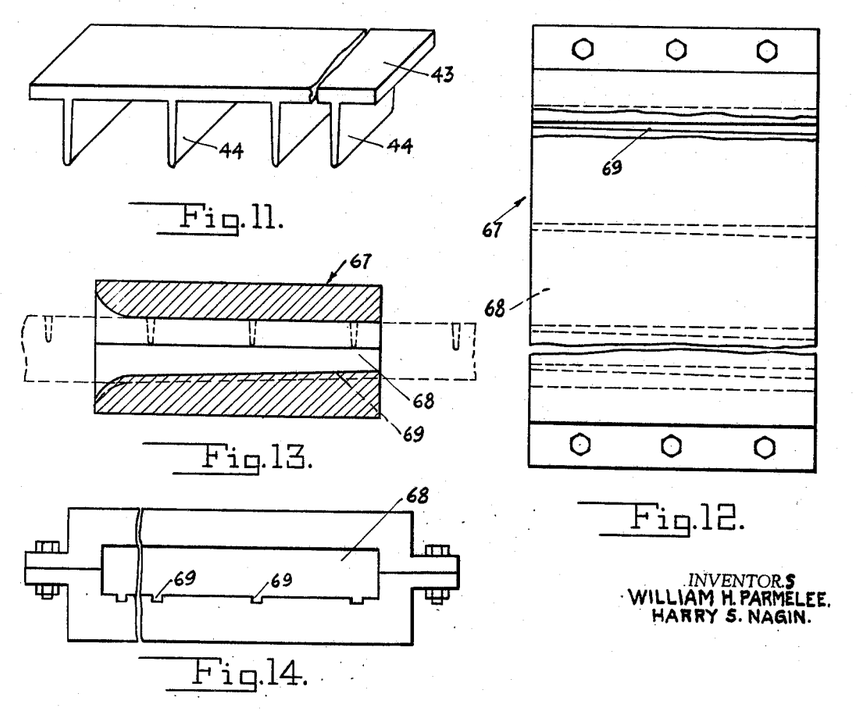
FIG. 11 is a detail view showing in perspective a refractory dam at the forward end of the casting section.
FIG. 12 is a top plan view of an extrusion die at the end of the casting machine.
FIG. 13 is a longitudinal section through the die shown in FIG. 12.
FIG. 14 is a front elevation of the die shown in FIG. 12.

Alternatively, or in addition to these rolls, the casting, if constituted of aluminum, may be forced through an extrusion die 67 arranged to compress the height of the longitudinal bars, and even effect a thickening of the bottom edges of these bars. The die, as shown in FIGS. 12, 13 and 14, comprises a body having a passage 68 of gradually diminishing height therethrough, and of a width to accept the grating. There are grooves 69 in the bottom in which the bottom edges of the longitudinal bars are guided, and which are of increasing width toward the discharge end so that as the bars reduce in height, the bottom edges may increase in thickness. Pinch rolls such as 66 at the inlet and at the outlet are driven at a speed regulated to conform to the speed of casting, or the speed of the rolls 71 may be set to exert a predetermined tension on the grating for work-hardening the metal.

Figure 16:
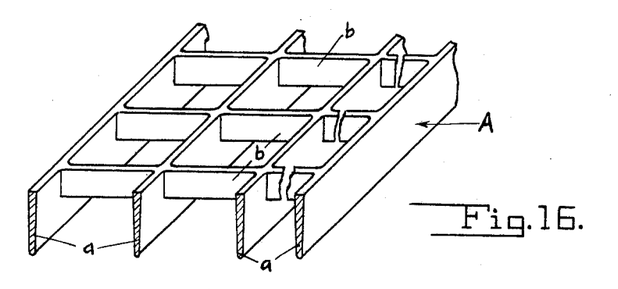
FIG. 16 is a perspective view of a portion of a typical grating designed to be made by the apparatus.
Figure 17:
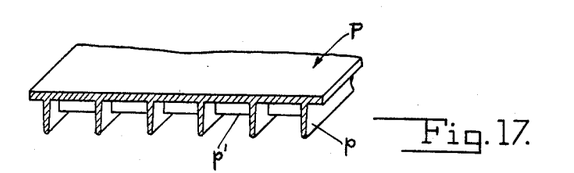
FIG. 17 is a perspective view of a portion of a flanged plate adapted to be made on the machine.

A portion of a typical cast grating is shown in FIG. 16 where the grating, designated A, has longitudinally deeper bars $a$ and cross bars $b$ of lesser depth. In FIG. 17 there is a cast metal plate P with integral longitudinal and transverse ribs $p$ and $p'$ respectively, on one face.

To form the plate shown in FIG. 17 the apparatus above described is used, but the cross bar or doctor blade 45 is elevated a predetermined distance above the surface of the molds instead of scraping the tops, and the stripping blade 49 is removed from an operative position. A water spray 45a may be located immediately behind the doctor blade 45 if necessary, to instantly chill the surface of the metal so that there will be no hydrostatic upflow beyond the blade due to any higher level of metal in the pool ahead of this blade.

For casting of plastic, it may not be desirable to preheat the molds since this may result in progressive hardening of plastic at the dam. A liquid casting plastic, such as commercial casting grade of polyester with a catalyst or hardener is supplied to the pool between the dam 43 and the doctor blade 45, and steam or heated fluid is supplied to the fluid-circulating arrangement 30 in the same manner described for the circulation of a cooling medium where metal is being cast. The top horizontal reach of the apparatus should be long enough so that the resin has obtained an initial gel or set before it reaches the discharge end. After the casting leaves the discharge end and is clear of the mold, it is carried on a run-out table into a curing oven through which it moves to complete the curing of the resin. The thermosetting resins applicable for this purpose cure without pressure in a temperature range between 150° and 300° F. and comprise, in addition to polyester, other long chain resins, including epoxy resins, particularly those of the type derived from the reaction of eipchlorohydrin and bisphenol, phenolic casting resins, and various copolymers with modifiers, plasticizers, etc., all of which are known to the art.

The resin may have incorporated therein short fibers of metal, glass, asbestos or other reinforcing or filler to improve the strength and/or reduce cost.

Figures 15, 18:
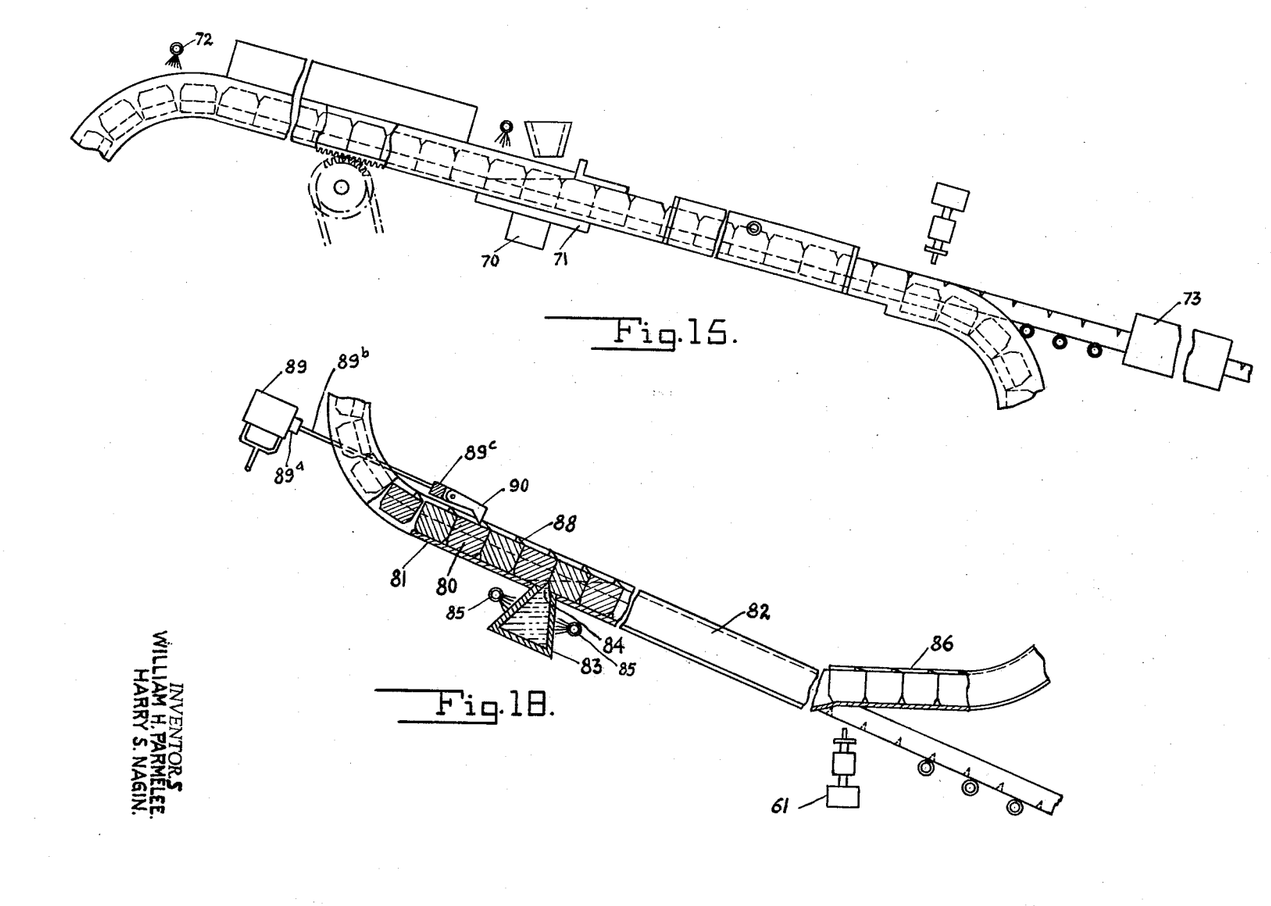
FIG. 15 is a fragmentary side elevation of a portion of the machine where the upper reach is inclined downwardly from the forward end with parts of the machine broken away.
FIG. 18 is a side elevation, partly in section, of a modification showing an arrangement where the molds are inverted in the casting area and showing schematically an alternative form of drive for the machine.

Instead of using the apparatus above described, wherein the top reach of the mold is level, it may be sloped from the higher forward end toward the rear as indicated in FIG. 15. This is desirable especially with casting resins since the dam at 43 is then not required, but the construction is otherwise the same and corresponding reference numerals have been used. However, in this view, I have also shown a vibrator 70, such as any well-known type of electric vibrator now available for compacting materials located under the casting section of the apparatus. This may be desirably used either with metal or plastic, but is especially useful with plastic having floc or other elongated reinforcing fibers that might retard filling of the mold cavities and in order to increase the density of the casting. This vibrator may also be used with the apparatus having a horizontal reach. It is schematically indicated as being attached to a plate 71 that is supported under the machine to simultaneously vibrate the several sections in the casting area.

Also, when casting resin, it may be desirable in all cases to spray the molds with a release material, as for example a thin film of paraffin or a quick-drying solution of a thermoplastic resin that will prevent the polyester, epoxy or other thermosetting resin from adhering to the mold. A spray nozzle for this purpose is shown at 72 in FIG. 15, but a similar nozzle may be used where the top reach of the mold is horizontal.

In FIG. 15 the secondary curing oven for finally curing the casting is indicated at 73, but here again, such an oven may be used with the apparatus having a horizontal bed in place of the metal working apparatus shown.

The invention further contemplates that the segmental mold be inverted and the liquid casting material be forced upwardly into the mold cavity, other applicable procedures hereinbefore described being usable. In FIG. 18 we have illustrated portions of such apparatus. The mold sections 80 are connected as heretofore, but they are inverted and move over a solid bed plate 81 in side rails 82 as heretofore described. At the casting area, there is a channel 83 under the bed plate that has a discharge slot 84 directed up through the bed plate against the mold. The liquid material, either metal or plastic, is forced upwardly through this nozzle or channel to fill the mold cavities as they move over the slot 84. With this arrangement, the machine may be inclined as shown to prevent the liquid from advancing through the channels too far ahead of the casting nozzle, or it may be horizontal with a dam, similar to 43 above described, but of course, inverted. With molten metal, burners may be arranged as necessary, and as indicated at 85, to keep the metal in the nozzle from solidifying. Casting material may be supplied from a pump or hydrostatic pressure means, not shown. At the runout or discharge end, the guide rails 86 are arranged to lift the mold sections vertically before they start to move around the return guides 87 to the upper level.

It is possible to so construct the machine therefore, by combining the two forms, to cast upright on the upper reach and to use the inverted molds on the lower reach, the castings emerging from opposite ends.

While the continuous drive previously described may be used, it may be desirable in some cases to move the continuous mold series intermittently so as to register the transverse mold grooves each time with the pouring or injection nozzle. As an illustration of this, we have shown in Fig. 18 ratchet-like teeth 88 on the bottom of each individual mold section. A fluid pressure cylinder 89 operates a piston rod 89a on which is a yoke 89b extending along each side of the machine and having a cross bar 89c on which is a pawl 90. With the piston rod retracted, the cylinder is energized to push the rod forward a distance to advance the mold, yoke and pawl the width of one mold section. The piston then retracts with the pawl riding over the tooth 88 of the folowing section, and in this case the supply vessel for the casting unit might be located at a station exactly where the cross groove stopped. The piston may be automatically actuated at regular intervals by mechanism, not shown, well known for such purpose.

Figure 2:
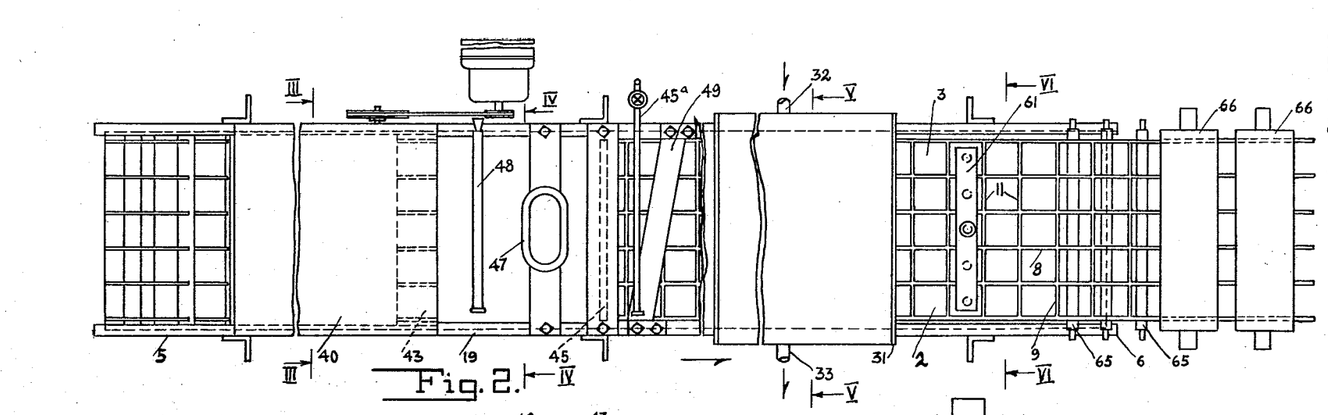
FIG. 2 is a top plan view of the machine shown in FIG. 1.
Figure 3:
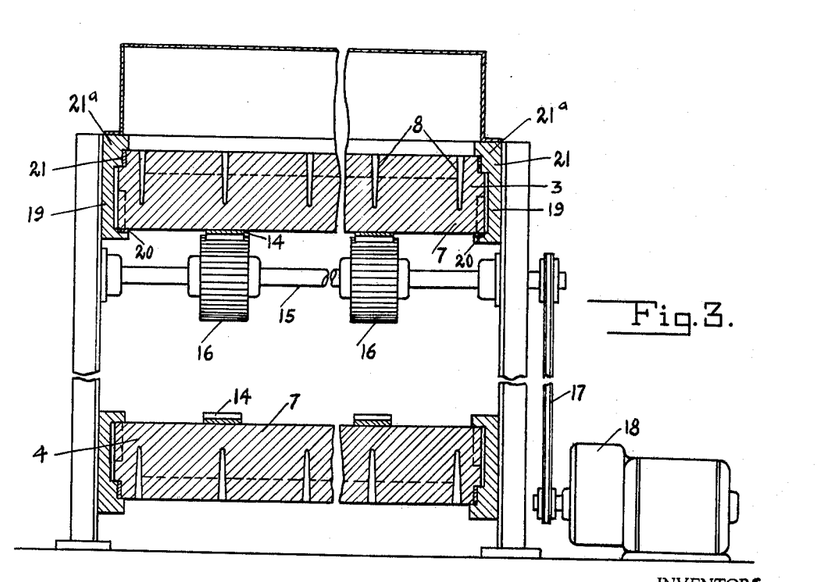
FIG. 3 is a transverse vertical section in the plane of line III—III of FIG. 1.
Figure 4:
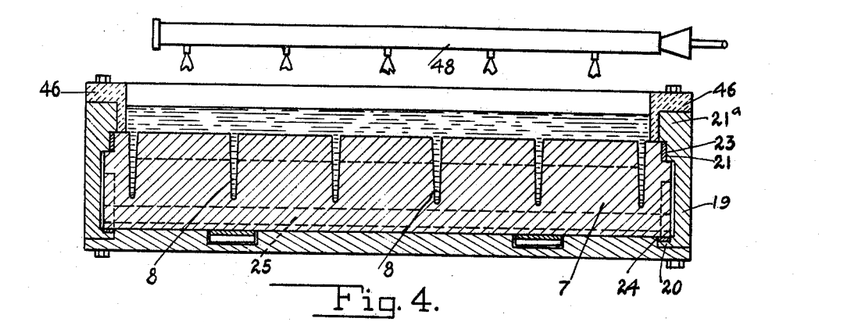
FIG. 4 is a transverse vertical section through the upper reach of the machine in the plane of line IV—IV of FIG. 1.
Figure 19:
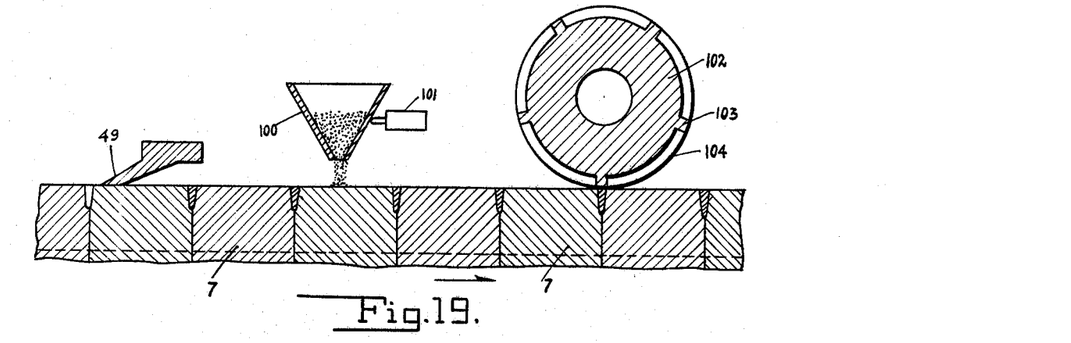
FIG. 19 is a fragmentary view on a larger scale of a portion of the apparatus shown in FIG. 1 between the shearing knife and the cooling section, but modified to shown means for spreading abrasive grit onto the plastic or semi-plastic casting and pressing it into the surface of the casting, the view being a longitudinal vertical section.

It is often desirable to embed abrasive grains into the tread surface of a grating for the purpose of improving its nonskid properties. In FIG. 19 there is illustrated more or less schematically one modification of the apparatus heretofore described for accomplishing this purpose. In FIG. 19 the mold elements or sections are arranged as described in FIGS. 1 and 2 and corresponding reference numerals have been used to designate the corresponding parts. However there is provided over the traveling mold at a location following the shearing blade 49, a hopper 100 having a vibrator 101 for continuously sifting or shaking abrasive grains such as silicon carbide or aluminum oxide or other grit material over the surface of the mold, including the freshly-formed casting. Positioned over the mold beyond the hopper 100 there is a pressure roller 102 having transverse ribs 103 thereon which are arcuately separated a distance corresponding to the spacing between the cross-bar forming grooves of the mold elements. This roll also has peripheral ribs 104 positioned to engage the tops of the longitudinal bars of the casting formed in the mold. Since the casting, particularly if it is aluminum or resin, is still in a somewhat plastic condition, the surface 102 with its protruding ribs will press the abrasive grains into the surface of the casting, but without pressing it onto the surface of the mold blocks themselves. For this reason the roll 102 is driven in synchronism with the movement of the mold elements, so that successive ribs 103 will register with the succeeding grooves forming the cross bars. This may be done by friction, but preferably some form of positive drive known to those skilled in the art would be employed in order to assure proper register of the elements on the roll 102 with the proper portions of the casting. Abrasive material that is not pressed into the surface of the casting may subsequently be brushed off and re-used. In the case of metal, the abrasive material will be firmly gripped as the metal into which the grains are pressed shrinks ever so slightly upon cooling, and in the case of a resinous composition the roll 102 would desirably be located in a position where the casting material was beginning to gel so that the plastic would bond to and form a matrix about the abrasive grains.

Figure 20:
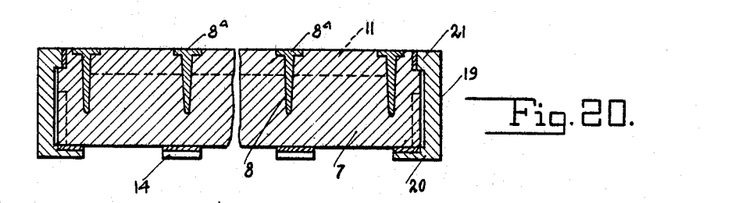
FIG. 20 is a view similar to FIG. 5 wherein the bearing bar-forming cavities are widened at the top to form flanges at the top of these bars.

FIG. 20 illustrates a modification in the mold elements themselves, this view being essentially the same as Fig. 5 with corresponding reference numerals designating corresponding parts. However the tops of the bearer barforming grooves 8 of the mold elements are widened out as indicated at 8a to form a flanged top edge on the bearer bars. If desirable, the cross-bar-forming groove may also be similarly widened. Such widening of the tops of the grooves will in no way interfere with the stripping of the mold elements from the casting which is formed in them.

Figure 21:
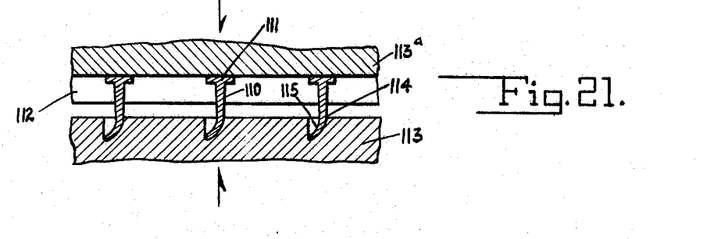
FIG. 21 shows an initial step in the process of flanging the bottoms of the bearing bars, the view being a fragmentary transverse vertical section.
Figure 22:
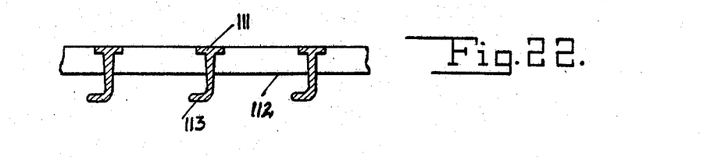
FIG. 22 is a view similar to FIG. 21 showing the flange completely turned.

FIGS. 21 and 22 show a fragment of a grating such as that formed by the mold of FIG. 20 wherein the bearer bars 110 have flanged tops 111 with the cross bars being indicated at 112. The bearer bars are of substantially greater depth than the cross bars. FIG. 21 shows the grating being subjected to pressure in the direction of the opposed arrows. This pressure may be applied either between rolls or between spaced top and bottom extrusion die elements, the lower pressure device being indicated at 113, and the top one 113a. The lower one is provided with groves 114 by means of which an initial curvature is imparted to the lower portions 115 of the bearer bars. By subsequent application of pressure in a similar manner between succeeding rolls or extrusion die surfaces, this curved portion is converted into a right-angle flange which may be thicker than the original bar. Sufficient metal may be thus formed into a flange to equal the metal in the flanges 111 at the top of the grating and thus maintain the neutral axis of the grating at a lower level and provide a structurally stable section.

It is contemplated that in the case of aluminum, for example, much of the heat from the cast metal may still be available for facilitating such deformation and shaping of the flanges, since the extrusion temperature of approximately 900° F. is several hundred degrees below its melting point of around 1230° F., but should the casting be too cold, additional heat may be applied, as by passing it through a tunnel-like furnace.

Figure 23:
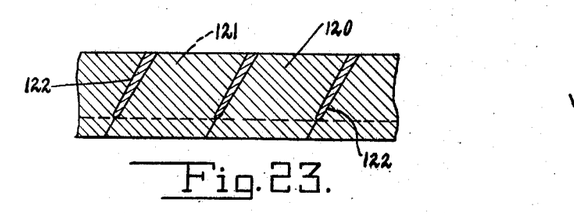
FIG. 23 is a longitudinal section through a succession of molds as previously described in which the cross grooves are as deep as the longitudinal grooves and are sloped rearwardly toward the bottom so that the cross bars are diagonal to the longitudinal ones.

In some instances it may be desirable to form the cross bars in a direction somewhat diagonal to the direction of the longitudinal elements as schematically indicated in FIG. 23 where the mold sections 120 are provided with at least two longitudinal grooves 121, and there are cross grooves 122 which are inclined from the top surface of the mold downwardly and rearwardly with respect to the direction of travel of the molds, and which are here shown as being substantially of the same depth as the grooves 121. The casting formed in a succession of molds so constructed might be used for example to provide a step ladder or a stair. In this case the removal of the mold elements would be downwardly and rearwardly with repect to the direction of travel of the mold and the casting, and in such case the links at the end of the individual mold sections may be desirably omitted, and provision made for individually dropping each mold element or section and carrying it forward to the beginning of the strand in which the casting is accomplished in a manner similar, for example, to that in which individual pallets of a sintering machine are returned to the statring position. This is merely illustrative of one way known to those skilled in the art in which each individual mold element or section in turn may be transferred from one end of the strand to the other.

All modifications and variations, including the continuous and intermittent drives for the mold, may be used where applicable with the other forms herein described.

In all cases the machine provides for the casting of gratings and other structures having longitudinal bars and cross connecting bars, and since the mold is traveling relative to the place where the hot metal is charged into the mold and the metal seeks its level by gravity, the groove-like cavities are filled progressively and mold gates or sprues usually associated with casting are not required. The grooves are tapered to facilitate stripping of the mold elements from the casting, and in most cases the longitudinal bars and cross bars of the casting are of generally substantially rectangular section.

While we have shown and described various embodiments of the invention and the manner of practicing the same, it will be understood that various changes and modifications may be made within the contemplation of our invention or under the scope of the following claims.

We claim:

1. A casting machine of the class described comprising:

a series of mold elements with side faces and top and bottom surfaces movable along a supporting structure as a unit, each of the elements being also movable in a plane normal to its direction of travel in the series, means for effecting movement of said series of mold elements along said supporting means in one direction in abutting side-by-side contact, each mold element having at least two grooves in one surface thereof extending from the front to the rear face thereof in the direction of travel of the elements along said supporting means with the said grooves of the several elements being in alignment to form continuous communicating channels along the length of the mold series so supported, the mold elements having also recesses in the same surface as the first grooves therein transverse to their direction of travel arranged to form across the surface of the series of mold elements so supported a succession of transverse grooves, these last-named grooves intersecting the first-mentioned ones, means for introducing a hardenable casting material into the grooves as the elements move along the supporting means and form a continuous casting therein, and means beyond the end of the supporting means over which the elements travel after the hardenable casting material has set arranged to engage that surface of each mold element in which the grooves are formed and effect movement of the mold element so engaged in a plane normal to its direction of travel and parallel with the contacting side face of the next-succeeding mold element sufficient to clear the mold from the solidified casting material which has formed in said second-named grooves.

2. A casting machine as defined in claim 1 werein the first-named grooves are widened at the surface of the mold elements in which they are formed to produce flanges on the portion of the casting formed in said grooves.

3. A casting machine as defined in claim 1 in which the first-named grooves are deeper than the second-named grooves, and means arranged to apply pressure to the casting in a direction normal to the plane of travel of the casting sufficient to form flanges on the lower edges of those portions of the casting which were formed in the deeper grooves of the mold elements, said last-named means being located adjacent the casting machine where the casting is still being pushed by succeeding portions of the casting still engaged in the mold elements.

4. A casting machine as defined in claim 1 having means positioned above the mold elements spaced from said means for introducing material into the grooves in their travel along the supporting means intermediate the ends of said means for supporting the series of mold elements in a plane arranged to apply abrasive grains to the surface of the hardenable casting material after it has been filled into the grooves and while it is in a plastic condition.

5. Casting apparatus for the continuous manufacture of a grating-like structure having longitudinal bars and cross bars, said apparatus compirsing:

a single endless series of traveling mold blocks linked together for relative movement in a plane normal to their plane of travel and in addition tilting movement about axes transverse to their direction of travel, a supporting structure in which said endless series of blocks is guided, said structure including guide means along which the blocks travel in a plane and wherein they are confined against movement relatively to each other, each block having a plurality of spaced parallel grooves therethrough extending in the direction of their travel, with said grooves of all of the blocks being in alignment, said series of blocks also having spaced recesses at intervals therealong forming cross grooves transverse to the direction of travel of the blocks and connecting said first grooves, means for moving the series of mold blocks and holding them pressed together in side-by-side relation in the travel along said guide means, and means for filling the grooves with a solidifiable casting material at one position where the blocks are confined by the guides and move in a plane and near the beginning of such portion of their travel, said guide means thereafter serving to hold the blocks in relative fixed relation to one another while the casting material is solidfying in the grooves, and means at the end of the guide means for separating the mold blocks in succession from the casting by effecting movement thereof first in a plane normal to their direction of travel and therafter tilting them about axes transverse to their direction of travel, and wherein the supporting structure has other guide means following the first guide means wherein relative vertical movement of the guide blocks is effected as the blocks clear said first guide means to thereby withdraw the blocks from the solidified casting which has been formed in the grooves, the supporting structure for the endless series of molds providing an upper reach and a lower reach, the grooves in the blocks opening upward in the upper reach, said first guide means being positioned along the upper reach, the second-named guide means being effective to provide clearance for the blocks to drop below the level in which they are positioned on the first guide means, said means for filling the grooves with casting material comprising a dam element over the blocks having depending fins filling the first-named grooves for confining the liquid against forward flow in the mold sections and a doctor blade spaced rearwardly of the dam and side curbs on the guide means between the dam and the doctor blade for confining a pool of the liquid over an area of the traveling blocks, and means for supplying the liquid casting material to the pool.

References Cited

UNITED STATES PATENTS

| | | | |
|---|---|---|---|
| 1,865,443 | 7/1932 | Perry et al. | 164–87 |
| 2,597,046 | 5/1952 | Sendzimer | 164–279X |
| 1,108,693 | 8/1914 | Burkhardt | 164–279 |
| 1,636,242 | 7/1927 | Prachar | 164–88.69 |
| 1,671,360 | 5/1928 | Fletcher | 164–278 |
| 1,651,678 | 12/1927 | Davis | 164–263 |
| 1,690,887 | 11/1928 | Davis | 164–283 |
| 1,736,308 | 11/1929 | Davis | 164–330 |
| 1,841,881 | 1/1932 | Davis | 164–330 |
| 1,841,297 | 1/1932 | Perry et al. | 164–87 |
| 2,357,931 | 9/1944 | Colburn | 164–283 |
| 3,342,251 | 9/1967 | Nagin et al. | 164–279 |

FOREIGN PATENTS

| | | |
|---|---|---|
| 897,412 | 5/1962 | Great Britain. |

J. SPENCER OVERHOLSER, Primary Examiner

V. RISING, Assistant Examiner

U.S. Cl. X.R.

29—528; 164—279, 331